United States Patent [19]

Endo

[11] Patent Number: 5,258,749
[45] Date of Patent: Nov. 2, 1993

[54] NON-INTERLACE DISPLAY DEVICE

[75] Inventor: Yasuyuki Endo, Tokyo, Japan

[73] Assignee: Sony Corporation, Tokyo, Japan

[21] Appl. No.: 664,815

[22] Filed: Mar. 5, 1991

[30] Foreign Application Priority Data

Mar. 8, 1990 [JP] Japan .................. 2-057675

[51] Int. Cl.$^5$ .............................. G09G 1/06
[52] U.S. Cl. ..................... 345/10; 358/140; 358/166
[58] Field of Search ........... 358/160, 140, 166, 141, 358/149, 31; 340/8.4, 7.7, 720

[56] References Cited

U.S. PATENT DOCUMENTS

| | | | |
|---|---|---|---|
| 3,534,170 | 10/1970 | Davies | 358/149 |
| 4,125,862 | 11/1978 | Catano | 358/140 |
| 4,300,162 | 11/1981 | Robers | 358/160 |
| 4,386,367 | 5/1983 | Peterson et al. | 358/140 |
| 4,412,251 | 10/1983 | Tanaka et al. | 358/140 |
| 4,426,661 | 1/1984 | Okada et al. | 358/140 |
| 4,449,143 | 5/1984 | Dischert et al. | 358/140 |
| 4,451,848 | 5/1984 | Okada et al. | 358/140 |
| 4,509,071 | 4/1985 | Fujimura et al. | 358/140 |
| 4,524,379 | 6/1985 | Okada et al. | 358/140 |
| 4,539,592 | 9/1985 | Tanaka et al. | 358/140 |
| 4,605,950 | 8/1986 | Goldberg et al. | 358/141 |
| 4,626,895 | 12/1986 | Reitmeier | 358/31 |
| 4,633,293 | 12/1986 | Powers | 358/140 |
| 4,636,857 | 1/1987 | Achiha et al. | 358/140 |
| 4,672,445 | 6/1987 | Casey et al. | 358/140 |
| 4,673,978 | 6/1987 | Dischert et al. | 358/140 |
| 4,723,163 | 2/1988 | Skinner | 358/140 |
| 4,733,300 | 3/1988 | Sugiyama et al. | 358/140 |
| 4,752,826 | 6/1988 | Barnett | 358/140 |
| 4,761,686 | 8/1988 | Willis | 356/140 |
| 4,764,964 | 8/1988 | Tanaka et al. | 358/31 |
| 4,811,094 | 3/1989 | Sakata | 358/160 |
| 4,868,657 | 9/1989 | Samuels | 358/140 |
| 5,029,001 | 7/1991 | Tanaka et al. | 358/140 |
| 5,046,164 | 9/1991 | Hurst, Jr. | 358/140 |
| 5,049,994 | 9/1991 | Nakamura | 358/140 |

FOREIGN PATENT DOCUMENTS 177078 2/1986 Japan .
26383 8/1986 Japan .

OTHER PUBLICATIONS

J. E. E. Journal of Electronic Engineering, Sep. 25, 1985, No. 225, Tokyo, Japan; "Asahi Broadcasting Develops System for Improved TV Image Resolution," by Hiroshi Shibata, pp. 80-85.

Patent Abstracts of Japan, Publication No. 61159881, Application No. 59279693, Dec. 31, 1984; Titled, "Television Transmission System".

*Primary Examiner*—Alvin E. Oberley
*Assistant Examiner*—Regina Liang
*Attorney, Agent, or Firm*—Philip M. Shaw, Jr.

[57] ABSTRACT

In a non-interlace display device, addition is performed in the level ratio of ¼ and ¾ at one field and in the level ratio of ¾ and ¼ at one field, and the display elements common in one field and other field are driven using the addition signal, thereby a good display image can be obtained without trouble due to flicker or pairing.

1 Claim, 2 Drawing Sheets

NON-INTERLACE DISPLAY DEVICE

BACKGROUND OF THE INVENTION

1. Field of the Invention

The present invention relates to a non-interlace display device to be applied to an image display device of large scale where, for example, a number of display elements are arranged in two-dimensional manner.

2. Description of the Prior Art

For example, an image display device of large scale has been developed where a number of display elements are arranged in two-dimensional manner as disclosed in Japanese patent application laid-open No. 177078/1986.

Also in such an image display device, a scan line conversion device during indicating so-called high vision signals has been developed as disclosed in Japanese patent application laid-open No. 26383/1986.

When video signals in the NTSC system for example are indicated by the above-mentioned image display device, in the prior art, display elements of 480 scan lines or more corresponding to the effective picture plane of the NTSC system are installed and driven alternately in every other scan line, thereby producing a display similar to the interlace system of a so-called cathode ray tube.

In the above-mentioned image display device, however, since the distance between the display elements can not be made very small, when the display elements of 480 scan lines or more are installed as above described, the whole device becomes significantly large.

Therefore it is being studied that the number of the display elements is made that of 240 scan lines corresponding to one field, and the display of so-called non-interlace system is performed.

In this case, in the most simple method, common display elements are driven by video signals per each field. In this method, however, the display becomes similar to the case that so-called pairing is produced in a cathode ray tube, and the picture quality is significantly deteriorated, for example, so-called line crawling is produced in the edge portion of the On the other hand, another method is in that in one field, the video signal is used as it is, and in the other field of the frame, upper and lower scan lines are added in a level ratio of ½, so that signals corresponding to scan lines of one field are formed and the common display elements are driven by these video signals. This can prevent the above-mentioned line crawling. In this method, however, since the processing of the video signal is different in one field and the other field, so-called flicker may be produced due to the level variation between them.

In the above-mentioned references, for example, a scan line conversion device is disclosed where 970 lines among the scan lines of high vision are converted in the ratio of ½ to form 485 scan lines of the NTSC system. That is, FIG. 3 shows procedure of the conversion. FIG. 3A shows the original signal (high vision), and a scan line in one field is shown by solid line and a scan line in the other field is shown by broken line respectively.

In FIG. 3, a first scan line (1o) and second scan line (2o) in one field are added in a level ratio of ¾ (first) and ¼ (second) respectively, to thereby form a signal corresponding to a first scan line (1'o) in one field, as shown in FIG. 3B. In a similar manner, from a third scan line (3o) and a fourth scan line (4o), from a fifth scan line (5o) and a sixth scan line (6o) ... signals of a second scan line (2'o), a third scan line (3'o) ... in solid line are formed in sequence.

Also a first scan line (1e) and a second scan line (2e) in the other field (of the frame) are added in a level ratio of ¼ (first) and ¾ (second) respectively, to thereby form a signal corresponding to a first scan line (1'e) in the other field as shown by broken line in FIG. 3B. In a similar manner, from a third scan line (3e) and a fourth scan line (4e), from a fifth scan line (5e) and a sixth scan line (6e) ..., a second scan line (2'e), a third scan line (3'e) ... in broken line are formed in sequence.

Consequently in this device, from signals of one field and the other field in high vision, signals of one field and other field in the NTSC system are formed, respectively, to thereby display an image in the NTSC system in interlace fashion. However, if this device is applied to the case that video signals in the NTSC system are displayed by the 240 scan lines as above described, the video signals in the interlace system of 240×2 fields are converted into that in the interlace system of 120×2 fields. In the image in such an interlace system, since the apparent resolution is decreased to about 70% (240×70%=168) due to so-called kell factor, the picture quality is deteriorated significantly.

SUMMARY OF THE INVENTION

In view of the above-mentioned disadvantages in the prior art, an object of the invention is to provide a non-interlace display device where a good display image in non-interlace fashion can be obtained in simple structure.

A device for causing a received input image signal to be displayed with first and second fields on a image display device comprising: a first amplifier for receiving an image signal from an external source and outputting an attenuated image signal having a level which is ¼ of its original level, a delay circuit connected to an output of the first amplifier for delaying the attenuated image signal for one horizontal period, a field decision circuit responsive to the received image signal for detecting the field of the received image signal and outputting a corresponding field decision signal, a second amplifier having a level gain of three, an adder connected to receive an output of said second amplifier and having an output connected to said image display device, and switch means responsive to the field decision signal for causing, when the field decision signal represents a first field, an output of said first amplifier to be inputted to said second amplifier and an output of said delay circuit to be inputted to said adder and for causing, when the field decision signal represents a second field, an output of said delay circuit to inputted to said second amplifier and an output of said first amplifier to be inputted to said adder.

According to this constitution, addition is performed in the level ratio of ¼ and ¾ in one field and in the level ratio of ¾ and ¼ in other field respectively and signals on the same scan line are formed in substantially the same signal processing, thereby performing a good, non-interlace display.

DESCRIPTION OF THE PREFERRED EMBODIMENTS

Figure 1:
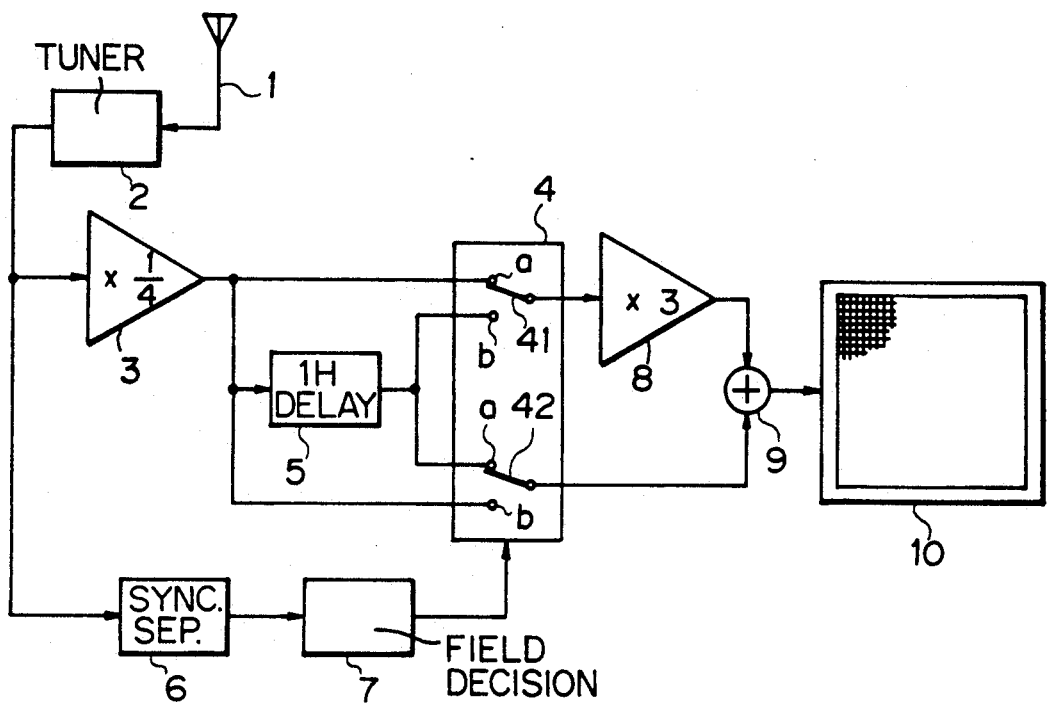
FIG. 1 is a constitution diagram of a non-interlace display device as an embodiment of the invention.

In FIG. 1, a signal from an antenna 1 is supplied to a tuner 2, and a desired television signal is received. A video signal in the received signal passes through an amplifier 3 attenuating the level to ¼ and is supplied to a first stationary contact a of a change-over switch 41 and a second stationary contact b of a change-over switch 42 in a switch device 4. Also a signal from the amplifier 3 is supplied through a delay circuit 5 of one horizontal period 1H to a second stationary contact b of the change-over switch 41 and a first stationary contact a of the change-over switch 42.

An image signal from the tuner 2 is supplied through a synchronous separation circuit 6 to a field decision circuit 7, and the decision signal is supplied to a control terminal of the switch device 4. At one field, the change-over switches 41, 42 are changed to the first stationary contacts a, and at the other field of the frame, the change-over switches 41, 42 are changed to the second stationary contacts b.

Further, the signal from the change-over switch 41 passes through an amplifier 8 amplifying the level to three times and is supplied to an adder 9, and the signal from the change-over switch 42 is supplied directly to the adder 9. The signal from the adder 9 is supplied to the image display device 10.

Figure 2:
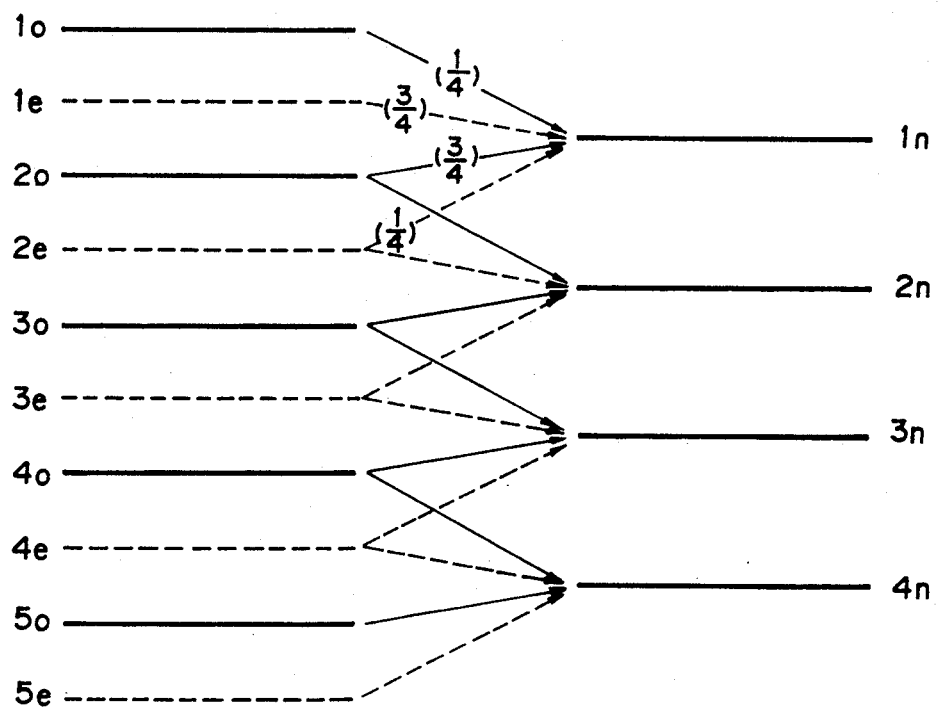
FIG. 2 is a diagram illustrating scan line conversion in the non-interlace display device.
Figure 3:
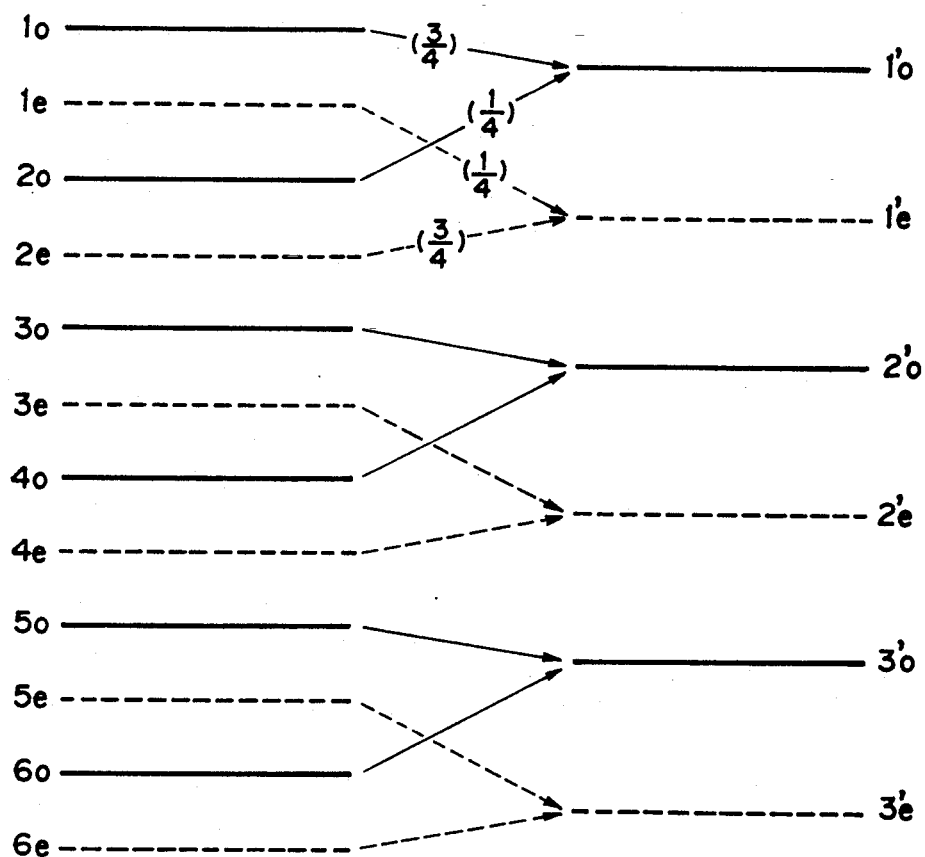
FIG. 3 is a diagram illustrating scan line conversion in the prior art.

Consequently in this device, when an original signal as shown in FIG. 2 (solid line at one field, and broken line at other field) is supplied, for example, when a second scan line (2o) of one field is supplied, a first scan line (1o) is attenuated to ¼ and taken from the delay circuit 5. The taken signal is added to a signal of a second scan line (2o) of the level of ¾ to thereby form a scan line (1n) as shown in FIG. 2. In similar manner, from a third scan line (3o) and the second scan line (2o), from a fourth scan line (4o) and the third scan line (3o) . . . , scan lines (2n) (3n) . . . are formed in sequence.

Also when a second scan line (2e) of other field is supplied, a first scan line (1e) is attenuated to ¼ and taken from the delay circuit 5. The taken signal is amplified to three times and made the level of ¾, and is also added to the signal of the second scan line (2e) attenuated to ¼ to thereby form a scan line (1n). In similar manner, from a third scan line (3e) and the second scan line (2e), from a fourth scan line (4e) and the third scan line (3e), . . . , scan lines (2n) (3n) . . . are formed in sequence.

That is, in this device, regarding one and other filters, signals corresponding to the same scan lines (1n) (2n) . . . are formed. These signals are supplied to the image display device 10, and the common display element is driven in one and other fields to thereby perform a non-interlace display.

Consequently in this device, deterioration of the picture quality due to pairing such as line crawling is not produced, and since the signal processing at one and the other fields is substantially the same processing, there is no fear of generating flicker or the like.

Also in this device, since 240 scan lines are displayed per each field, the resolution of this scan line number is substantially secured. On the contrary, for example, the resolution of the interlace display of 480 scan lines becomes about $480 \times 70\% = 336$ due to the kell factor. Consequently, in the above-mentioned display, about 70% of the resolution in the original television display can be obtained. This scarcely produces trouble in ordinary viewing.

Thus according to the above-mentioned device, addition is performed in the level ratio of ¼ and ¾ at one field and in the level ratio of ¾ and ¼ at the other field, thereby a signal on the same scan line is formed by substantially the same signal processing and therefore good display in non-interlace can be performed.

The above-mentioned device can be applied to the image display not only in the NTSC system but also in the CCIR system.

Also the above-mentioned device can be applied not only to a signal received from the tuner 2 but also to a signal from other video signal sources such as a video camera, a VTR or the like.

Further in the above-mentioned device, the image display device 10 can be applied not only to such devices as disclosed in the references but also to a device where a liquid crystal display device and many other light emission elements are arranged.

According to the invention, since addition is performed in the level ratio of ¼ and ¾ at one field and in the level ratio of ¾ and ¼ at other field, signals on the same scan line are formed by substantially the same signal processing respectively thereby good display in non-interlace can be performed.

What is claimed is:

1. A non-interlace display device for causing a received input image signal to be displayed with first and second fields on a image display device comprising:

a first amplifier for receiving an image signal from an external source and outputting an attenuated image signal having a level which is ¼ of its original level, a delay circuit connected to an output of the first amplifier for delaying the attenuated image signal for one horizontal period, a field decision circuit responsive to the received image signal for detecting the field of the received image signal and outputting a corresponding field decision signal, a second amplifier having a level gain of three, an adder connected to receive an output of said second amplifier and having an output connected to said image display device, and switch means responsive to the field decision signal for causing, when the field decision signal represents a first field, an output of said first amplifier to be inputted to said second amplifier and an output of said delay circuit to be inputted to said adder and for causing, when the field decision signal represents a second field, an output of said delay circuit to be inputted to said second amplifier and an output of said first amplifier to be inputted to said adder, said image display device being supplied with said adder output to drive common display elements in one field and another field to thereby perform non-interlace display.

* * * * *